United States Patent [19]

Arieh

[11] 4,058,204
[45] Nov. 15, 1977

[54] BELT CONVEYOR
[75] Inventor: Simon Arieh, Geneva, Switzerland
[73] Assignee: Battelle Memorial Institute, Carouge, Geneva, Switzerland
[21] Appl. No.: 686,224
[22] Filed: May 12, 1976

Related U.S. Application Data

[63] Continuation-in-part of Ser. No. 470,290, May 15, 1974, Pat. No. 3,967,720.

[30] Foreign Application Priority Data

May 16, 1973 Switzerland .......................... 6942/73
May 16, 1975 Switzerland .......................... 6365/75

[51] Int. Cl.$^2$ ............................................. B65G 16/30
[52] U.S. Cl. ................................................. 198/833
[58] Field of Search ............... 198/331, 330, 329, 328, 198/847, 833, 836; 74/937; 161/44, 43, 49, 38

[56] References Cited
U.S. PATENT DOCUMENTS 3,414,108 12/1968 Jackson et al. ...................... 198/331
3,666,085 5/1972 Folkes ................................. 198/847

Primary Examiner—James B. Marbert

[57] ABSTRACT

A belt conveyor having at least one straight load bearing section and comprising a pair of flexible elementary belts which are each reinforced at least longitudinally by a reinforcing layer embedded in the vicinity of the neutral axis thereof and which each have a regular array of projections and intermediate recesses arranged so that the projections of one belt fit exactly into the recesses of the other belt.

A guide apparatus for the belt provides first curved path portions to progressively bring the belts together into mutual positive engagement and rigidly interlocked relationship at one end of the straight load bearing section and second curved path portions to progressively separate the belts beyond the opposite ends of the straight section. The guide includes belt deflecting devices which define the first and second curved path portions in the vicinity of each end of the straight load bearing section such that the elementary belts are deflected in opposite directions around centers of curvature which are longitudinally shifted with respect to each other at each end of the straight section, thereby to substantially obviate friction between the projections and recesses of the elementary belts when the belts undergo progressive mutual engagement and separation at each end of the straight load bearing section.

6 Claims, 4 Drawing Figures

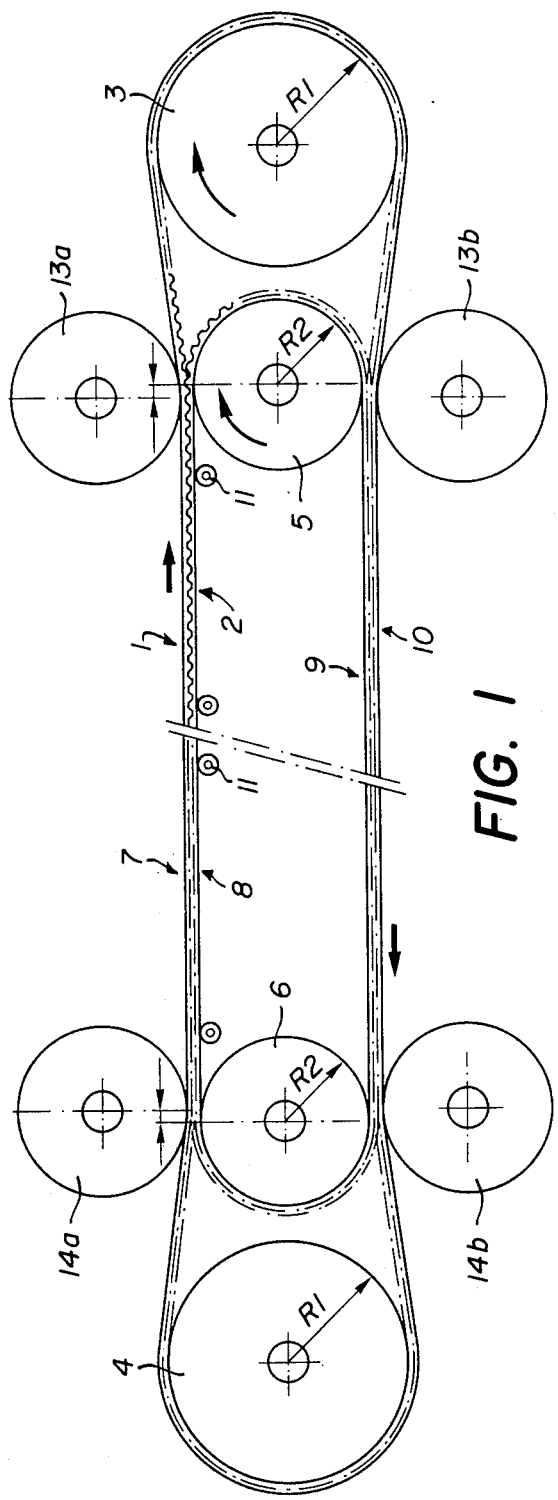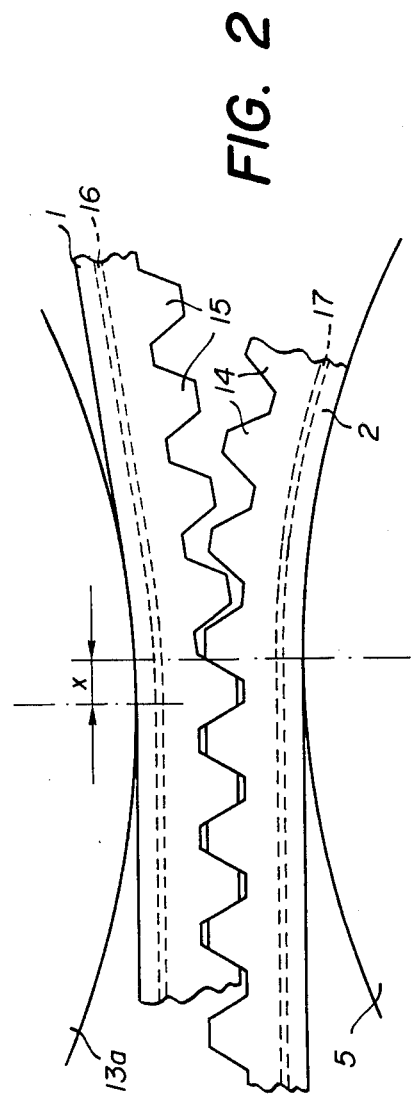

BELT CONVEYOR

CROSS-RELATED APPLICATION

This application is a C-I-P of Ser. No. 470,290 filed May 15, 1974, and now issued as U.S. Pat. No. 3,967,720.

FIELD OF THE INVENTION

The present invention relates to a belt conveyor comprising a pair of flexible elementary belts each reinforced at least in the longitudinal direction by a reinforcing layer embedded in the vicinity of its neutral axis, and each having a series of projections and intermediate recesses disposed regularly on one of its faces in a manner to permit the exact interengagement of the projections of each belt in the recesses of the other belt of the said pair and comprising in addition a belt guide means associated with the said belts in a manner to permit the longitudinal movement of the belts along predetermined paths comprising at least one common straight section in which the belts are held and maintained exactly engaged in a manner to form a composite rigid beam for the transport of loads.

BACKGROUND OF THE INVENTION

A conveyor of the above type is the subject of U.S. Pat. No. 3,967,720. Therein is disclosed a belt conveyor having at least one straight load bearing section and comprising:
- a pair of flexible elementary belts which are each reinforced at least longitudinally by a reinforcing layer embedded in the vicinity of the neutral axis thereof and which each have a regular array of projections and intermediate recesses arranged so that the projections of one belt fit exactly into the recesses of the other belt: and
- belt guide means which provides first curved path portions to progressivley bring said belts together into mutual positive engagement and rigidly interlocked relationship at one end of said straight load bearing section, which support and maintain said belts rigidly interlocked along said straight section, and which further provides second curved path portions to progressively separate said belts beyond the opposite ends of said straight section.

This construction presents very substantial advantages, notably for the transport of heavy loads, namely:
i. the exact engagement of two elementary belts permits the formation of a composite beam presenting a rigidity which is several times higher than that of two belts taken individually or superimposed and connected in any other manner (without exact interengagement); in fact, it becomes possible thereby to temporarily realize, due to such assemblage of a composite unitary beam, on the straight section adapted for the transport of loads, an effect of optimal reinforcement which results from the combined action of the respective reinforcing layers of the two elementary belts.
ii. In return, when the two belts are separated from one another they will present a relatively high flexibility since the reinforcing layer is situated as close as possible to the neutral axis of each belt; thus due to the great flexibility of each separate belt, it is possible to easily obtain any change of direction desired in the travel of the conveyor by conducting the belts along separate curvilinear paths having relatively small radii.

Band conveyors generally require changes of direction more or less substantial over their path and, in particular, reversal of direction at the extremities of the straight section of an endless belt conveyor.

It is therefore, obvious that the changes of direction are also necessary along the path of travel of the belt conveyor according to the present invention and in particular at the two extremities of the said composite beam, namely, on the one hand at the extremity of engagement (by exact interfitting) and on the other hand at the extremity of separation of the two elementary movable belts.

Thus, although the formation of a composite beam, such as that provided according to the prior application has the substantial advantages mentioned hereinabove, the exact interengagement that it necessitates can nevertheless lead to a more or less substantial friction between the mutual contact surfaces of the two elementary belts during their movements of interengagement and of separation. Thus, there is the risk that the friction will lead to a more or less rapid wear of the interengagement surfaces of the two bands.

Moreover, since the speed of the conveyor is preliminarily fixed according to the intended usage, the speed of relative movement which results in the two elementary belts therefrom is also fixed and cannot be reduced as desired in order to reduce substantial friction.

Thus, the wear of the interengaged surfaces of the two elementary belts is of great importance fro the formation of a composite beam according to the present invention since such wear can lead to a play susceptible of cancelling the exact interengagement, thus losing the important advantages mentioned hereinabove.

SUMMARY OF THE INVENTION

An object of the present invention is to provide a construction to assure in all cases, the said advantages of the composite beam obtained by exact interengagement, while avoiding all substantial friction between the interengaging surfaces of the two elementary belts.

To this end, the band conveyor according to the invention, is characterized by the improvement wherein the guide means includes belt deflecting means which define the first and second curved path portions in the vicinity of each end of the straight load bearing section such that the elementary belts are deflected in opposite directions around centers of curvature which are longitudinally shifted with respect to each other at each end of the straight load-bearing section, thereby to substantially obviate friction between the projections and recesses of the elementary belts when said belts undergo progressive mutual engagement and separation at each end of said straight load-bearing section.

The attached drawings schematically represent, by way of example, one embodiment as well as variants of an endless belt conveyor according to the present invention.

BRIEF DESCRIPTION OF THE DRAWING

FIG. 1 is a schematic view in elevation of an embodiment according to the invention.

FIG. 2 shows a detail of FIG. 1 on enlarged scale.

DETAILED DESCRIPTION OF DRAWING

Figure 3:
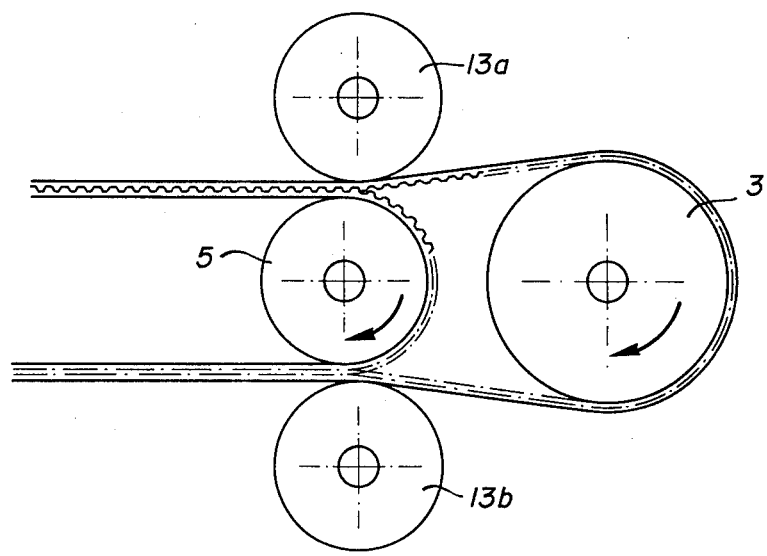
FIG. 3 is a partial view of the belt conveyor showing a variant of the embodiment according to FIG. 1.

As seen in FIG. 1, the belt conveyor comprises a pair of flexible elementary endless belts 1 and 2 respectively forming upper superposed lengths 7 and 8 which constitute an upper straight section for the transport of loads and lower superposed lengths 9 and 10 for the return of the belts 1 and 2 to their upper lengths.

Guide means are additionally associated with the bands 1 and 2 in a manner to maintain them at all times in the relative positions shown in FIG. 1 in the course of their movement in the direction indicated by the arrow.

The interior endless belt 2 is guided and maintained taut between two rotatable drums 5 and 6 which reverse the direction of its travel at the two extremities of its upper length 8 and lower length 9; guide rollers 11 serve additionally to support the upper length 8 and thus to support indirectly the upper length 7 of the exterior belt 1 which serves for the transport of loads.

The exterior endless belt 1 is guided and held taut by two rotatable drums 3 and 4 disposed at the interior of the loop formed by this belt and, in addition, by two pairs of exterior rollers 13a, 13b and 14a, 14b, these pairs being respectively situated in the vicinity of the drums 3 and 4 but at the exterior of the loop formed by the belt 1.

The belts 1 and 2 are driven in synchronism by the drums 3 and 5 respectively, these latter being driven by synchronous motors (not shown) or by any other suitable drive means. The drums 4, 6, the rollers 13a, 13b, 14a, 14b, and the rollers 11 are mounted freely.

As is shown is FIG. 1, the axes of the four drums are situated in the same horizontal plane and the radius $R_1$ of the drums 3 and 4 associated with the exterior belt 1 is greater than the radius $R_2$ of the drums 5 and 6 associated with the interior belt 2 for a reason which will be given later.

In addition, the axes of the rollers for each length 13a, 13b and 14a, 14b are respectively disposed in the same vertical plane and they are horizontally offset from the axes of drums 5 and 6 by a distance $x$, which is at least equal to the magnitude of the mean width of a projection 14 or 15. (FIG. 2)

The belts 1 and 2 are respectively provided with identical projections 14 and 15, and longitudinal reinforcements in the form of a layer 16, 17 disposed in the vicinity of the neutral axis of each belt (see FIG. 2).

The projections 14 and 15 are formed so that they mesh and interengage exactly with one another such that the belts 1 and 2 are rendered completely rigidly interlocked with one another in the longitudinal direction.

Due to said complete longitudinal rigid interlocking which is effected by the exact interengagement of the projections 14 and 15, the upper lengths 7 and 8 are interengaged and rigidly secured to constitute together a composite beam (7, 8) which presents an extremely high longitudinal rigidity with respect to the rigidity of two belts taken individually, or even superposed, but without rigid interlocking by such exact interengagement of the projections.

The drive means described hereinabove operate in the following manner:

The composite beam formed by the upper lengths 7 and 8, longitudinally secured by exact interengagement of the projections 14 and 15, is supported by the drums 5 and 6 at each extremity as well as by the intermediate rollers 11.

This composite beam 7, 8 can thus support extremely high loads, as the reinforcement layers 16 and 17 have a combined reinforcement action which is very high. When the bands are moved in the direction indicated by the arrows, this composite beam 7, 8 constitutes a movable section permitting the transport of loads on the surface of the length 7 extending from the roller 14a to the roller 13a.

However, the particular disposition of the guide means provided in the described manner at the two extremities of the upper lengths 7, 8 and the lower lengths 9, 10 is specially conceived to avoid all substantial friction at the time of the movements of meshing and of unmeshing of the projections 14 and 15 at each extremity of the upper lengths 7, 8 and lower lengths 9, 10 of the two belts 1 and 2.

The particular effect which is obtained due to the guide means described hereinabove and represented in FIG. 1 can be explained by a considering firstly the meshing engagement of the upper lenghts 7 and 8 (upper left corner of FIG. 1):

i. the drum 6 reverses the direction of movement of the interior belt 2 along a curvilinear path (at the periphery of drum 6 at radius $R_2$). This path causes the belt 2 to be progressively raised to lead it tangentially at the inlet of the upper length 8.

ii. The drum 4 reverses the direction of movement of the exterior belt 1 at the periphery of drum 4, whose radius $R_1$ is greater than $R_2$. The belt 1 is thus raised above the level of its upper length 7 before arriving at the roller 14a which directs it downwardly along a curvilinear path having a center of curvature which coincides with the axis of the roller 14a and extending tangentially to the inlet of the upper length 7 of the belt 1.

iii. Thus, on the said two curvilinear paths, whose centers of curvature coincide respectively with the axes of the roller 14a and of the drum 6 and are longitudinally offset by a distance $x$ (see FIG. 1), the two belts 1 and 2 are progressively flexed towards one another, in the direction of a median plane of intermeshing.

iv. Due to this relative disposition of the curvilinear portions, the belts 1 and 2 thus progressively approach one another from opposite sides of the median plane of intermeshing and present centers of curvature which are longitudinally offset. One thus obtains a progressive release of the two projection surfaces in the direction of said plane of intermeshing. The flexibility of the two belts 1 and 2, over their respective curvilinear paths, as has been described, assures a temporary increase, exactly at the desired moment, of the spacing between the tips of the neighboring projections 14 such that the projections 14 successively insert without difficulty in the recesses between the neighboring corresponding projections 15 and vice versa. This spacing is thus progressively reduced up to a normal value in the course of intermeshing; the projections 14 and 15 are finally exactly interengaged when they arrive at the inlet of the upper lengths 7 and 8 and remain in mesh and exactly interengaged up to the outlet of these lengths. Additional guide rollers (not shown) can be associated laterally with the upper length 7, if necessary, to assure the support of the lengths 7 and 8 in their position of exact interengagement over the entire extent of these lengths.

However, the reverse affect is obtained at the outlet of the lengths 7 and 8 where the belts 1 and 2 are unmeshed and are progressively disengaged as has been shown on an enlarged scale in FIG. 2.

As a result of the preceding and from FIGS. 1 and 2, it becomes possible thus to avoid the friction between the projections 14 and 15, due to the relative disposition described of said curvilinear paths of the belts 1 and 2 at the time of their meshing and unmeshing.

In addition, as appears in FIG. 3, one can also envisage a variation of FIG. 1 in which the longitudinal offset distance x between the axies of the rollers 13a, 13b with respect to the axis of drum 5, is in the opposite direction as is the offset of the rollers 14a, 14b with respect to the drums 6. Thus there is obtained essentially the same effect as described hereinabove with respect to FIG. 1.

Figure 4:
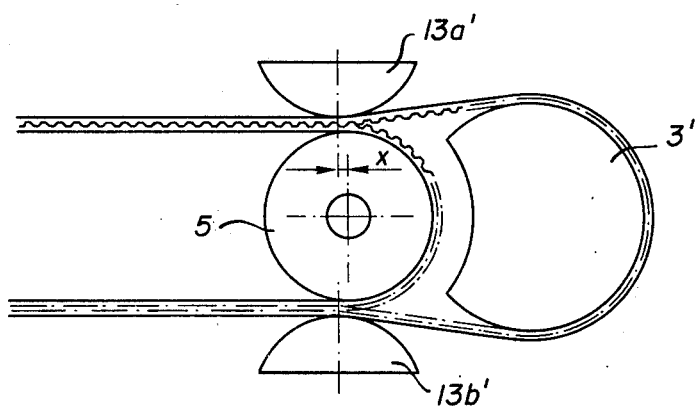
FIG. 4 shows a second variant of FIG. 1.

As appears additionally in FIG. 4, there is shown a variation in which the drum 3 and rollers 13a, 13b are replaced by fixed guide members 3' and 13a' and 13b' respectively; similar fixed members (not shown) will be then disposed at the other extremity of the conveyor to replace the drum 4 and rollers 14a, 14b respectively. The relative disposition of said curvilinear paths will then be essentially the same as that according to FIG. 1 or according to the variation of FIG. 3. The drive of these two bands will thus be made solely through the intermediary of the drum 5.

It is understood that the projections of the elementary belts can have any other desired profile than that shown in the drawing, on the condition that they permit an exact interengagement and a complete rigid interlocking, at least longitudinally.

In fact, the elementary belts can be provided with projections and hollws having different forms as long as they allow the formation of a composite beam by their exact interengagement as has been described hereinabove. However, the longitudinal offset distance x will, in all cases, be at least equal to the magnitude of the mean width of each projection.

What is claimed is:

1. In a belt conveyor having at least one straight load bearing zone and comprising:
    a. a pair of flexible elementary belts each having a neutral axis and a reinforcing layer embedded in the vicinity of said neutral axis so as to reinforce each belt at least longitudinally;
    b. a regular array of projections and intermediate recesses arranged on one side of each elementary belt so that the projections of one belt fit exactly into corresponding recesses of the other belt thereby to provide positive engagement with rigid interlocking of the elementary belts so as to render them solid with each other, at least longitudinally by their superposition and positive engagement along straight portions thereof; and
    c. belt guide means which define the paths of the elementary belts so as to provide: first curved path portions arranged to bring the elementary belts progressively together into mutual positive engagement and rigidly interlock relationship at one end of said load bearing zone of the conveyor; a common straight path portion wherein the superposed elementary belts remain positively engaged and rigidly interlocked from said one end to the opposite end of the straight load bearing zone and are thereby made solid with each other at least longitudinally whereby to transmit shear forces due to flexure from one belt to the other, so that the elementary belts thereby form together a straight, rigid composite beam assembly wherein the respective reinforcing layers of the belts of this assembly exert a combined reinforcing action providing substantial rigidification of the composite beam assembly; and second curved path portions arranged to progressively disengage and thereby separate said elementary belts beyond said opposite end of the load bearing zone, whereby said belts may separately undergo a desired directional change along their respective second curved path portions, the improvement consisting of:
    d. said guide means including belt deflecting means so arranged in the vicinity of each end of said straight load bearing zone that said elementary belts are deflected in opposite directions around centers of curvature which are longitudinally shifted with respect to each other at each end of said straight load bearing zone, to thereby substantially obviate friction between said projections and recesses when said belts are on the one hand progressively engaged and thereby brought into rigidly interlocked relationship at one end of said straight load bearing zone, and when the rigidly interlocked belts are, on the other hand, progressively separated from each other beyond the opposite end of said straight zone of the conveyor.

2. A belt conveyor according to claim 1 wherein said projections have a mean longitudinal thickness and wherein said centers of curvature are longitudinally shifted by a distance at most equal to one half of said mean thickness.

3. A belt conveyor according to claim 1 wherein said belt deflecting means comprises rounded members.

4. A belt conveyor according to claim 3 wherein said rounded members are rotatable rollers.

5. A belt conveyor according to claim 4 wherein said centers of curvatures of the rollers coincide with the axes of rotation of said rollers.

6. A belt conveyor according to claim 3 wherein said rounded members are fixed and have curved surfaces facing the belts.

* * * * *